US012613164B1

(12) United States Patent
Dell'Omo et al.

(10) Patent No.: US 12,613,164 B1
(45) Date of Patent: Apr. 28, 2026

(54) POST-OPERATIVE LONGITUDINAL FAILURE ANALYSIS USING OBTAINED SENSOR DATA OF A PHYSICAL MACHINE

(71) Applicant: Tractian Technologies Inc, Atlanta, GA (US)

(72) Inventors: Canyon Grey Dell'Omo, Atlanta, GA (US); Lucas Custodio da Silva, Florianópolis (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/312,001

(22) Filed: Aug. 27, 2025

Related U.S. Application Data

(63) Continuation-in-part of application No. 19/278,709, filed on Jul. 23, 2025.

(51) Int. Cl.
| | |
|---|---|
| *G01M 99/00* | (2011.01) |
| *G06F 3/0482* | (2013.01) |
| *H04Q 9/00* | (2006.01) |

(52) U.S. Cl.
CPC ......... *G01M 99/005* (2013.01); *G06F 3/0482* (2013.01); *H04Q 9/00* (2013.01); *H04Q 2209/826* (2013.01)

(58) Field of Classification Search
CPC ....... G01M 99/005; G06F 3/0482; H04Q 9/00
See application file for complete search history.

(56) References Cited

U.S. PATENT DOCUMENTS

| | | | |
|---|---|---|---|
| 2018/0216990 A1* | 8/2018 | Rothwell | G01H 1/00 |
| 2019/0041842 A1* | 2/2019 | Cella | G06N 5/046 |
| 2019/0108747 A1* | 4/2019 | Stenning | G08B 21/187 |
| 2020/0051419 A1* | 2/2020 | Malaver | H04L 67/10 |
| 2021/0335059 A1* | 10/2021 | Dixit | G05B 23/0254 |
| 2023/0281527 A1* | 9/2023 | Cella | G06V 20/17 |
| | | | 705/7.17 |

* cited by examiner

*Primary Examiner* — Ricky Go
(74) *Attorney, Agent, or Firm* — Cognition IP, P.C.; Edward Steakley

(57) ABSTRACT

An automated maintenance, monitoring and diagnostics infrastructure can include small, portable sensor devices, which can be attached to industrial machines and physical equipment. The sensor devices include wireless communication facilities and an accelerometer, capable of measuring vibration signals. Based on received sensor data, the system determines an anomaly associated with a physical equipment and periodically evaluates additional data generated by the sensor device and determines an occurrence in a change of the anomaly.

18 Claims, 15 Drawing Sheets

300

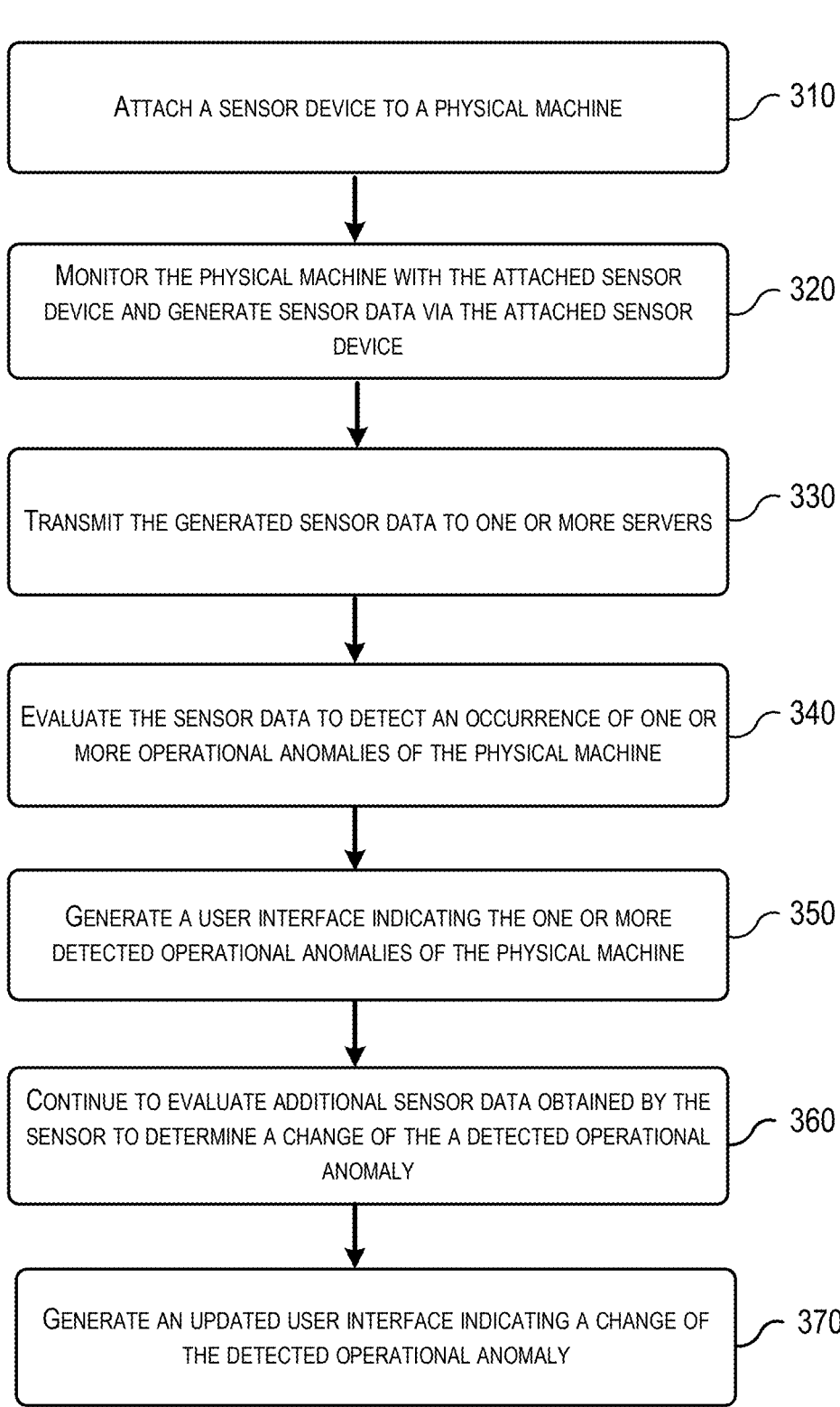

ATTACH A SENSOR DEVICE TO A PHYSICAL MACHINE — 310

MONITOR THE PHYSICAL MACHINE WITH THE ATTACHED SENSOR DEVICE AND GENERATE SENSOR DATA VIA THE ATTACHED SENSOR DEVICE — 320

TRANSMIT THE GENERATED SENSOR DATA TO ONE OR MORE SERVERS — 330

EVALUATE THE SENSOR DATA TO DETECT AN OCCURRENCE OF ONE OR MORE OPERATIONAL ANOMALIES OF THE PHYSICAL MACHINE — 340

GENERATE A USER INTERFACE INDICATING THE ONE OR MORE DETECTED OPERATIONAL ANOMALIES OF THE PHYSICAL MACHINE — 350

CONTINUE TO EVALUATE ADDITIONAL SENSOR DATA OBTAINED BY THE SENSOR TO DETERMINE A CHANGE OF THE A DETECTED OPERATIONAL ANOMALY — 360

GENERATE AN UPDATED USER INTERFACE INDICATING A CHANGE OF THE DETECTED OPERATIONAL ANOMALY — 370

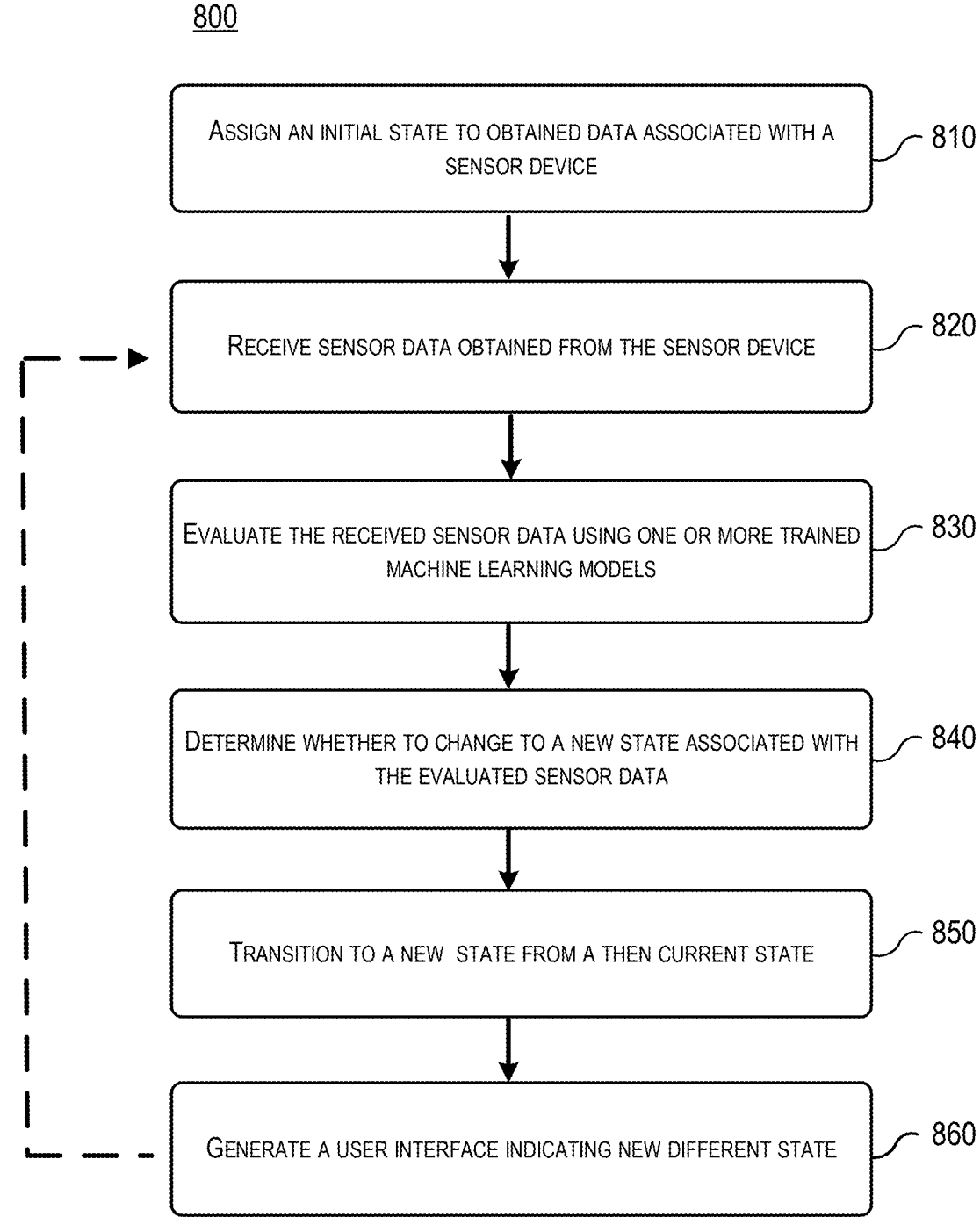

ASSIGN AN INITIAL STATE TO OBTAINED DATA ASSOCIATED WITH A SENSOR DEVICE — 810

RECEIVE SENSOR DATA OBTAINED FROM THE SENSOR DEVICE — 820

EVALUATE THE RECEIVED SENSOR DATA USING ONE OR MORE TRAINED MACHINE LEARNING MODELS — 830

DETERMINE WHETHER TO CHANGE TO A NEW STATE ASSOCIATED WITH THE EVALUATED SENSOR DATA — 840

TRANSITION TO A NEW STATE FROM A THEN CURRENT STATE — 850

GENERATE A USER INTERFACE INDICATING NEW DIFFERENT STATE — 860

| Current State | New State | Condition | Min. Time | Confidence |
|---|---|---|---|---|
| Observe | Worsening | Gradual Worsening | 24 hours | 65% |
| Observe | Danger | Abrupt Worsening | 2 hours | 90% |
| Observe | Improving | Clear Improvement | 48 hours | 50% |
| Worsening | Danger | Continued Worsening | 12 hours | 95% |
| Worsening | Observe | Stabilization | 72 hours | 65% |
| Danger | Worsening | Beginning of Improvement | 24 hours | 90% |
| Danger | Observe | Significant Improvement | 48 hours | 40% |
| Improving | Observe/Danger | Anomaly Return | 24 hours | 70% |

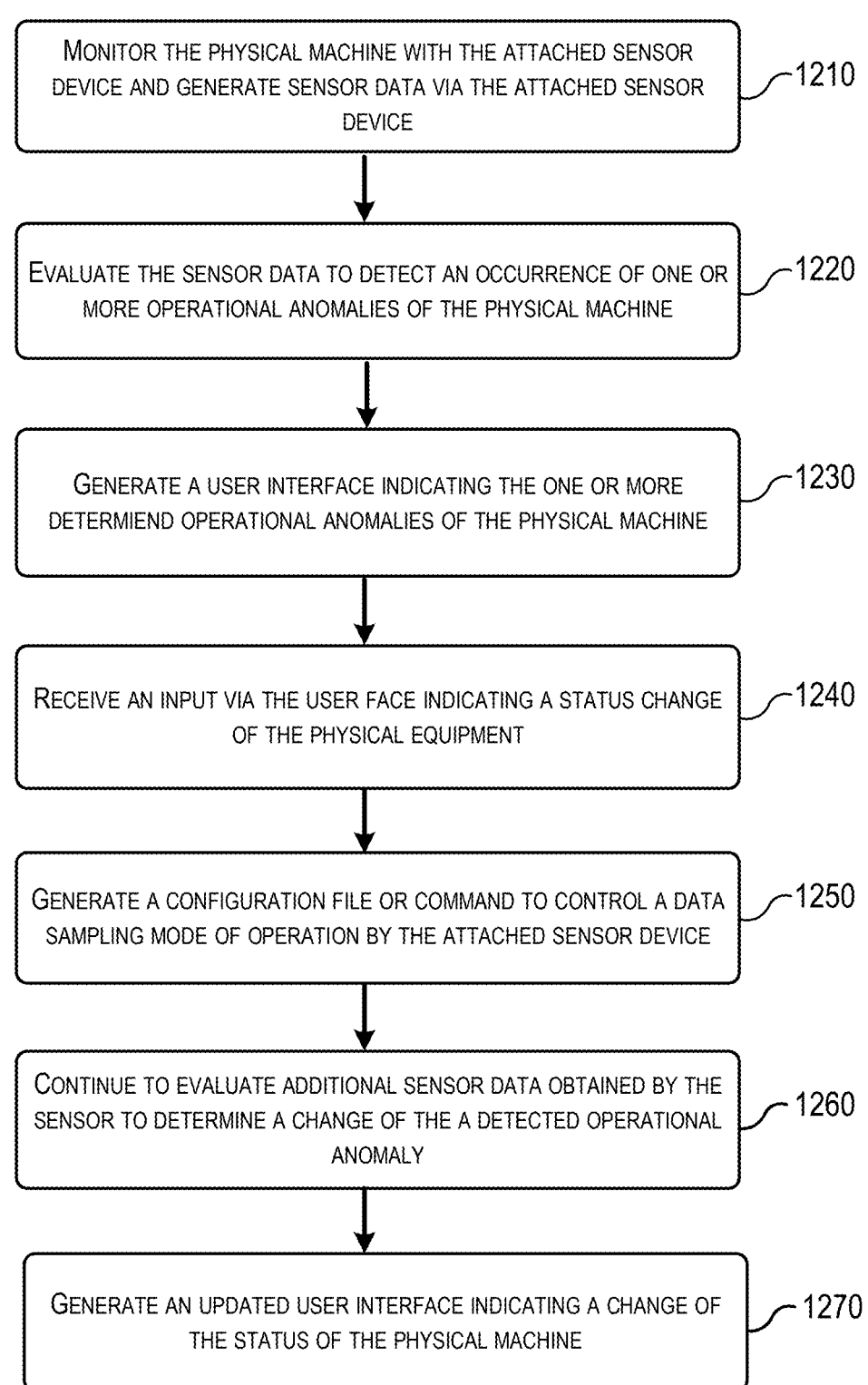

MONITOR THE PHYSICAL MACHINE WITH THE ATTACHED SENSOR DEVICE AND GENERATE SENSOR DATA VIA THE ATTACHED SENSOR DEVICE ⌐1210

EVALUATE THE SENSOR DATA TO DETECT AN OCCURRENCE OF ONE OR MORE OPERATIONAL ANOMALIES OF THE PHYSICAL MACHINE ⌐1220

GENERATE A USER INTERFACE INDICATING THE ONE OR MORE DETERMIEND OPERATIONAL ANOMALIES OF THE PHYSICAL MACHINE ⌐1230

RECEIVE AN INPUT VIA THE USER FACE INDICATING A STATUS CHANGE OF THE PHYSICAL EQUIPMENT ⌐1240

GENERATE A CONFIGURATION FILE OR COMMAND TO CONTROL A DATA SAMPLING MODE OF OPERATION BY THE ATTACHED SENSOR DEVICE ⌐1250

CONTINUE TO EVALUATE ADDITIONAL SENSOR DATA OBTAINED BY THE SENSOR TO DETERMINE A CHANGE OF THE A DETECTED OPERATIONAL ANOMALY ⌐1260

GENERATE AN UPDATED USER INTERFACE INDICATING A CHANGE OF THE STATUS OF THE PHYSICAL MACHINE ⌐1270

FIG. 12

POST-OPERATIVE LONGITUDINAL FAILURE ANALYSIS USING OBTAINED SENSOR DATA OF A PHYSICAL MACHINE

CROSS-REFERENCE TO RELATED APPLICATIONS

This application is a continuation-in-part of U.S. application Ser. No. 19/278,709, filed on Jul. 23, 2025, which is hereby incorporated in its entirety.

BACKGROUND

Field

This invention relates generally to the field of signal processing and more particularly to post-operative longitudinal failure analysis of physical machines.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial plants can include numerous mechanical machines with thousands of moving parts. To increase the efficiency of plant operations, the machines can be monitored for maintenance purposes. Monitoring can include a trained technician visually inspecting the machines, observing the machine operations, and listening for any abnormal auditory cues that can indicate a present or potential maintenance-related fault in the machines. The technicians can also perform more sophisticated diagnosis, using maintenance and diagnostic tools. Continuous monitoring of industrial machines can present operational inefficiencies and cost to an industrial plant, particularly as the number of machines can be substantial in an industrial plant. For these and similar reasons, plants or busy shops with mechanical machines can benefit from an automated maintenance infrastructure. The automatic maintenance infrastructure can continuously collect maintenance-related data from various machines, detect maintenance-related events, and recommend appropriate action.

SUMMARY

In some embodiments, a monitoring system provides an automated maintenance, monitoring and diagnostics infrastructure that include sensor devices, which can be attached to industrial machines and physical equipment. The sensor devices include wireless communication facilities and an accelerometer, capable of measuring vibration signals. Based on received sensor data, the system determines a condition state of the physical equipment. The system then and periodically evaluates additional data generated by the sensor device and determines an occurrence in a change of the condition state to a different condition state.

In some embodiments, the monitoring system includes multiple sensor devices that are each attached to separate physical equipment. The multiple sensor devices each include an accelerometer and a thermal sensor. The sensor device attached to the physical equipment are configured to periodically generate sensor data and transmit the generated sensor data to a computing device. The generated sensor data may include a timestamp for each respective occurrences of the generated sensor data. The sensor device is configured to receive remote configuration files and/or commands to change the operational functionality of the sensor device.

In some embodiments, the monitoring system includes one or more servers that perform analysis of the generated sensor data. The one or more servers receive from each of the multiple sensor devices the sensor data generated by the attached sensor devices.

The system processes the received data and determines one or more anomalies associated with the monitored physical equipment. The system further determines one or more condition states associated with the monitored physical equipment.

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

FIG. 3 is a process flow chart illustrating an exemplary method 300 that may be performed in some embodiments.

FIG. 8 is a process flow chart illustrating an exemplary method 800 that may be performed in some embodiments.

FIG. 9 illustrates a table description exemplary equipment states and monitoring time for the condition state.

FIG. 12 is a process flow chart illustrating an exemplary method 1200 that may be performed in some embodiments.

DETAILED DESCRIPTION

Figure 1A:
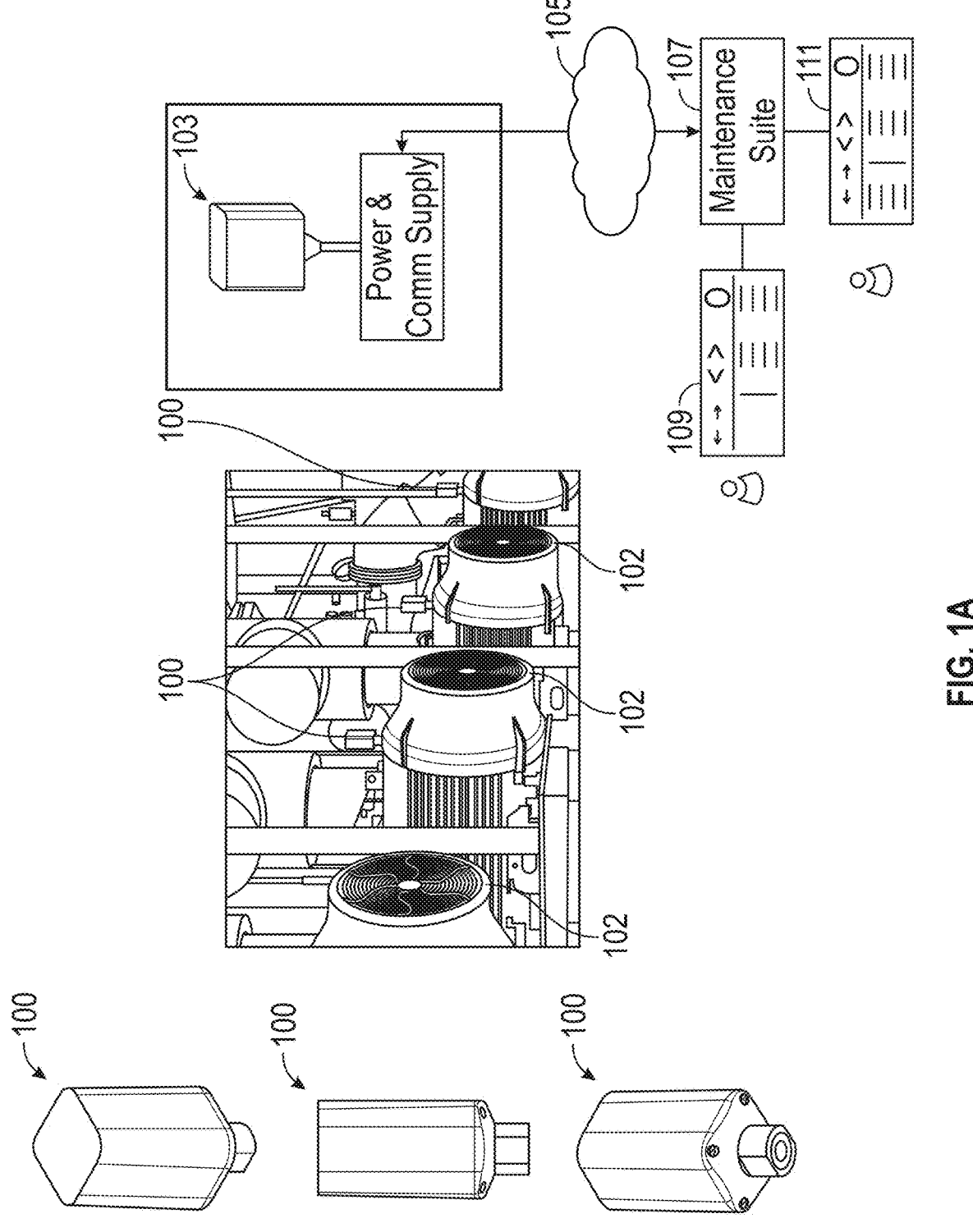
FIG. 1A illustrates example diagrams of a sensor device, industrial machines, and an infrastructure of fault monitoring and maintenance operations according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well-known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include one or more processors, one or more memory devices, and one or more non-transitory computer-readable storage medium. The memory and non-transitory storage medium may store instructions, that when executed by the one or more processors perform the methods and steps described herein.

Industrial machines can benefit from consistent and accurate fault monitoring with artificial intelligence processing of the monitored data. In some embodiments, a plurality of small sensor device assemblies, each equipped with wireless communication circuitry can be attached to various industrial machines in a plant. The sensor devices can sense and report various operational parameters related to fault monitoring. For example, temperature and vibration can be monitored and reported. The quality of vibrations, vibration trend data and other characteristics can be indicators of fault occurring or developing in an industrial machine. Similarly, temperature and temperature trends of a machine can include indicators of occurring or upcoming faults in the machine.

FIG. 1A illustrates example diagrams of a sensor device 100, industrial machines 102, and an infrastructure of fault monitoring and maintenance operations according to some embodiments. The sensor device 100 can be battery operated and can include a variety of sensing components enclosed in a housing. The sensor device 100 can attach to machines 102 in the plant using a magnetic connection and/or by using other methods of attachment and fastening to secure the sensor devices 100 to machines 102 in the plant. The attachment of the sensor devices 100 to machines 102 can depend on the magnitude of the vibrations and other considerations related to the environment of the machines 102 and the plant. For example, if larger magnitude vibrations are expected, the connection between the sensor devices 100 and the machines 102 can be secured with an adhesive agent, so the sensor devices 100 can maintain their connections to the machines 102, despite large vibrations.

The sensor devices 100 can include wireless communication circuitry and can be in wireless communication with one or more receivers 103. In some embodiments, one or more sensor devices 100 can be modified to be in wired communication with a receiver 103 and have a connection to an outlet source of power. In other words, the source of power and a type of communication of the sensor devices 100 can be modified, depending on the application and the environment of the plant to include any combination of battery-operated, outlet-operated, wired communication, and wireless communication. Similarly, the receivers 103 can include both wired and wireless communication circuitry. The receivers 103 can also be powered with or without the use of a battery. In some embodiments, both the sensor devices 100 and the receivers 103 can wirelessly communicate to a portable computer, such as a laptop, a smart phone, a smart tablet, or other portable devices, in the field, using a local or cellular wireless network. Although the term receiver is used, the receivers 103 can also send data to sensor devices 100. Consequently, receivers 103 can be transceiver devices. For example, a receiver 103 can send a configuration file to a sensor device 100 to enable, disable or otherwise configure various operating parameters of the sensor device 100.

Both sensor devices 100 and receivers 103 can include processing and communication circuitry. For example, both sensor devices 100 and receivers 103 can include microprocessors, permanent and impermanent memory devices, and transceivers or equivalent devices. Sensor devices 100 and receivers 103 can perform various data processing when transmitting and/or receiving sensor data, and/or instructions and specifications data, related to their respective operations.

The numbers and locations of the receivers 103 can depend on the size of the plant and the numbers and distances of the sensor devices 100, relative to the receiver 103 and the wireless communication technology used to communicate between the sensor devices 100 and the receiver 103. The receivers 103 can be mounted at various locations in a plant and can have connection to a power and a communication source. For example, the receivers 103 in a plant can be in wired and/or wireless communication to one or more communication portals 105. Example communication portals 105 can include a local network, the Internet, one or more cloud infrastructures, gateways, other receivers 103, and other communication midpoints, or endpoints. The receivers 103 can transmit the fault monitoring data for upstream processing. The receivers 103 can also receive various operational configuration files, settings files, and/or other operating parameters and can transmit the operating parameters to the sensor devices 100. Examples operating parameters can include various timing and frequency of when and how the sensor devices 100 should collect data from the machines 102.

A maintenance suite 107 can receive monitoring data from the sensor devices 100 and perform processing related to fault monitoring and maintenance operations on the data. The maintenance suite 107 can include a variety of submodules and databases that can support processing of the monitoring data, including, storage of the data, generating reports from the data, extracting trends from the data, generating fault prediction from the data, generating maintenance action items, tickets, generating alerts, and/or other automated actions related to the maintenance of the machines 102. In some embodiments, the operations of the maintenance suite 107 can include artificial-intelligence submodules that can assist in fault prediction, maintenance recommendation pattern and trend detection, and other data analytics action, augmented or generated by artificial intelligence models. Example artificial intelligence techniques and/or models used by maintenance suite 107 can include neural networks, deep neural networks, machine learning, convolutional neural networks (CNNs), random forests, and others.

The maintenance suite 107 can support a variety of user interfaces (UIs). For example, the maintenance suite 107 can support a frontend user interface 109 and a backend user interface 111. Various parameters related to the operation of the sensor devices 100 can be viewed and/or modified via the user interfaces 109, 111. The user interfaces 109, 111 can provide access for a user to generate or modify configuration files, settings and operating parameters for the sensor devices 100 and the maintenance suite 107. The users can also view the output of the maintenance suite 107 via the user interfaces 109, 111. In some implementations, a user who is a customer of the maintenance suite 107, for example, a plant maintenance department, can have access to the maintenance suite 107 via the frontend user interface 109, while the administrators and engineers of the maintenance suite 107, can internally access the maintenance suite 107, via the backend user interface 111.

While not shown, the sensor devices 100 are not the only maintenance-related in-field components operated by the maintenance suite 107. Other components associated with monitoring and maintenance of the machines 102 and the plant can also be in communication with the maintenance suite 107. For example, in some embodiments, energy management components, in communication with the maintenance suite 107, can monitor the power consumption of the machines 102 and the plant.

Depending on the size of an industrial plant, the sensor devices 100 can be numerous, for example in the hundreds or thousands. The maintenance suite 107 can streamline and track data from hundreds or thousands of machines 102 and automate the identification and tracking of maintenance-related tasks for a large industrial plant, having hundreds or thousands of machines 102.

Figure 1B:
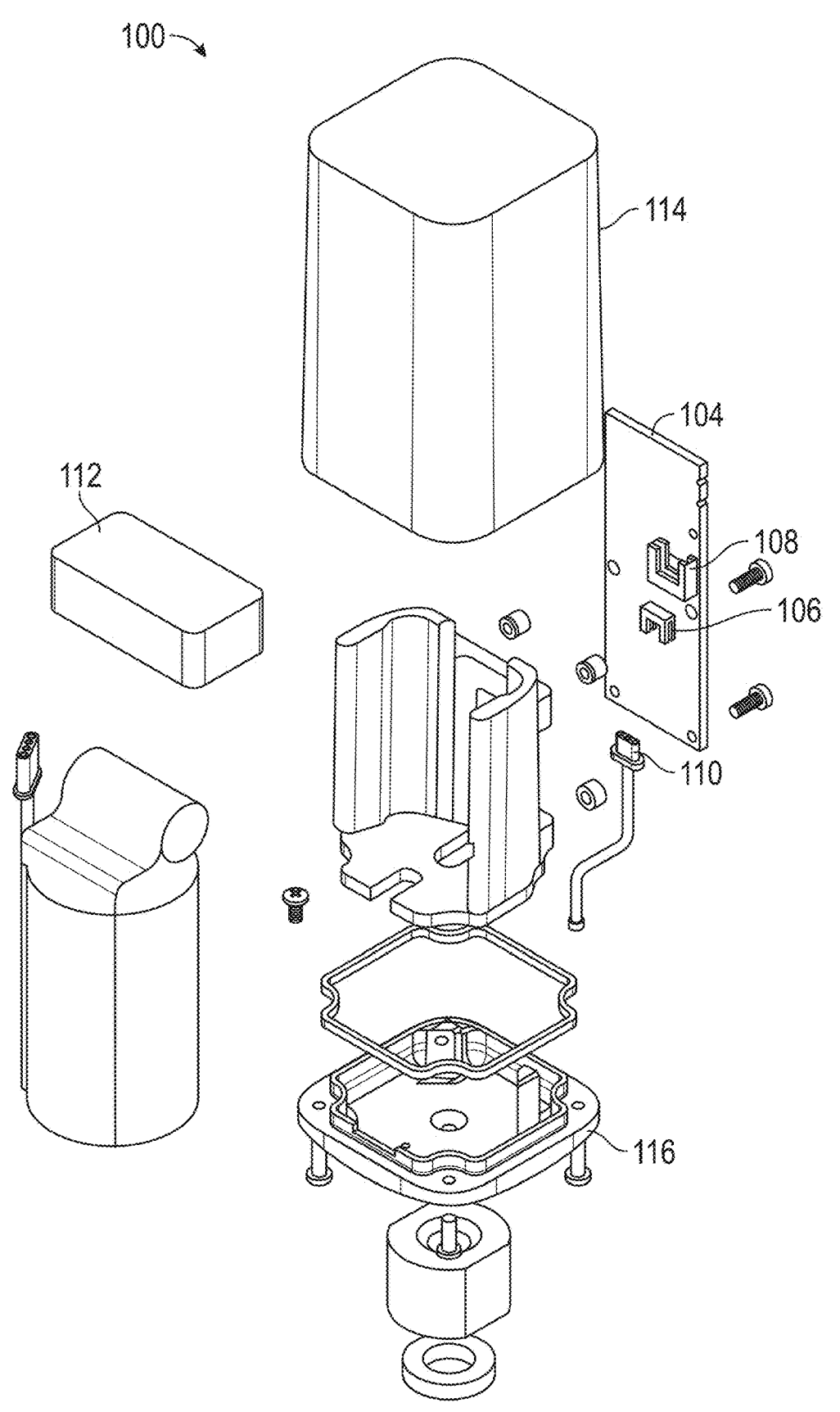
FIG. 1B illustrates an exploded view of the sensor device of the embodiment of FIG. 1A.

FIG. 1B illustrates an exploded view of a sensor device 100. Some example components include the printed circuit board (PCB) 104, the microcontroller 106, an accelerometer 108, a temperature sensor 110, a battery module 112, various spacers, holders, internal conduits, and a housing 114. The housing 114 can house the internal components of the sensor device 100. A housing lid 116 can enclose the housing 114 and seal the internal components of the sensor device 100 from the outside. The sensor device 100 can be made water-, dust- and particle-resistant by a variety of techniques. For example, in some implementations, the sensor device 100 can be resin-coated. The battery module 112 can include one or more lithium-ion batteries, and a battery management system (BMS). In other embodiments, the BMS can be external to the battery module 112, for example, it can be mounted on the PCB 104. In some embodiments, the life expectancy of the battery module 112 can be between three to five years. In some embodiments, the sensor device 100 can be manufactured using application-specific integrated circuit (ASIC) technology, in lieu of or in addition to using a PCB technology.

The sensor device 100 can include communication circuitry, corresponding to the communication circuitry of one or more receivers, for example, the receivers 103, and one or more local, private and/or public communication network, including one or more cellular networks. The choice of network and communication circuitry can depend on the size of the plant and the distance of the sensor device 100 from a receiver 103. The communication circuitry of the sensor device 100 can be mounted on the PCB 104. In some embodiments, the communication circuitry may be integrated in the microcontroller 106. Similarly, in other embodiments, various components can be combined into one or use a component that integrates several components together. On the other hand, some components, for example, the communication circuitry of the sensor device 100, can be a separate module, embedded on the PCB 104, or otherwise separately included in the sensor device 100. In some embodiments, the communication circuitry of the sensor device 100 can include a transceiver, as an independent component, or as an internal component of another component, such as the microcontroller 106. The microcontroller 106 can alternatively be referred to as a microprocessor or as a processor. In some implementations, the microcontroller 106 can include a plurality of processors. The sensor device 100 can include a magnetic collar to provide magnetic attachment between the sensor device 100 and the machine 102. In some embodiments, the temperature sensor 110 can be routed to a surface very near the point of contact between the sensor device 100 and the machine 102 to provide a more accurate reading of the temperature of the machine 102.

The accelerometer 108 can be a micro-electro-mechanical system (MEMS) accelerometer, capable of one, two, or three axis acceleration data. For example, in some embodiments, the accelerometer 108 can measure forces in three directions along the XYZ axes. The accelerometer 108 can measure and transmit both magnitude and spectral data of the vibrations of a machine 102 to the microcontroller 106. Consequently, the accelerometer 108 is capable of collecting the machine vibrations of the machine 102 in three directions, along the x-axis, the y-axis and the z-axis.

The microcontroller 106 can be a collection of various components, including computer or computing components. Example components of the microcontroller 106 can include a processor, or a microprocessor, such as a central processing unit (CPU), permanent and impermanent memory, including for example, random access memory (RAM) of various kinds, solid state, flash or other permanent memory, interconnects, buses and communication vias between the various components. In some embodiments, the microcontroller 106 can include external communication circuitry to enable wireless communication, including radio frequency identification (RFID), Bluetooth, cellular, or other communication technologies. In other embodiments the sensor device 100 can include dedicated wireless communication circuitry, fabricated or included in the sensor device 100, in a separate component than the microcontroller 106.

The sensor devices 100 can be configured to spend the majority of their time in hibernation state to conserve battery power. In hibernation mode, the power to all or some of the components of the sensor device 100 can be reduced or minimized, thereby reducing the overall battery consumption in the hibernation state. The sensor devices 100 can be configured to periodically exit hibernation mode and enter normal operation mode, where power and functionality to some or all components is restored. For example, the sensor devices 100 can perform periodic sampling of various operational parameters of the machines 102, such as temperature and vibrations. When scheduled sampling is not performed, the sensor devices 100 can be in hibernation mode. As an example, a sensor device 100 can collect vibration data for two-minutes at every ten-minute intervals. Frequency of sampling is an example of the operational specification and parameters that can be specified and used to configure the sensor device 100, accordingly.

The sensor devices 100 can perform a variety of samplings of machine operation parameters. For example, for the vibration parameter of the machines 102, the sensor devices 100 can perform various samplings at different intervals and with different characteristics. Example sampling characteristics can include sampling intervals, sampling frequency, sampling rate, sampling range, sampling resolution and other characteristics. Sampling interval can refer to the period by which the sensor device 100 turns ON and performs a sampling with a selected set of sampling characteristics. In some embodiments, the sensor devices 100 can be configured to perform scheduled sampling sessions, which are samplings performed at selected intervals. The selected intervals can depend on the type of machines 102 and other factors that are application-dependent, based on where the sensor devices 100 are used. Example sampling intervals can include sampling with intervals separated by minutes, hour or hours, days, or even months, and other intervals.

The sensor device 100 is a battery-operated device. In most applications extending the longevity of the sensor device 100 is proportional to the longevity of the battery module 112. A significant portion of the battery consumption of the sensor device 100 relates to the transmission of data to the receiver 103. In some implementations of the described infrastructure, the sensor device 100 can compress sensor data, and transmit a compressed data structure to the receiver 103, in order to increase the reliability of transmission and to reduce the battery consumption of the sensor device 100.

Figure 2:
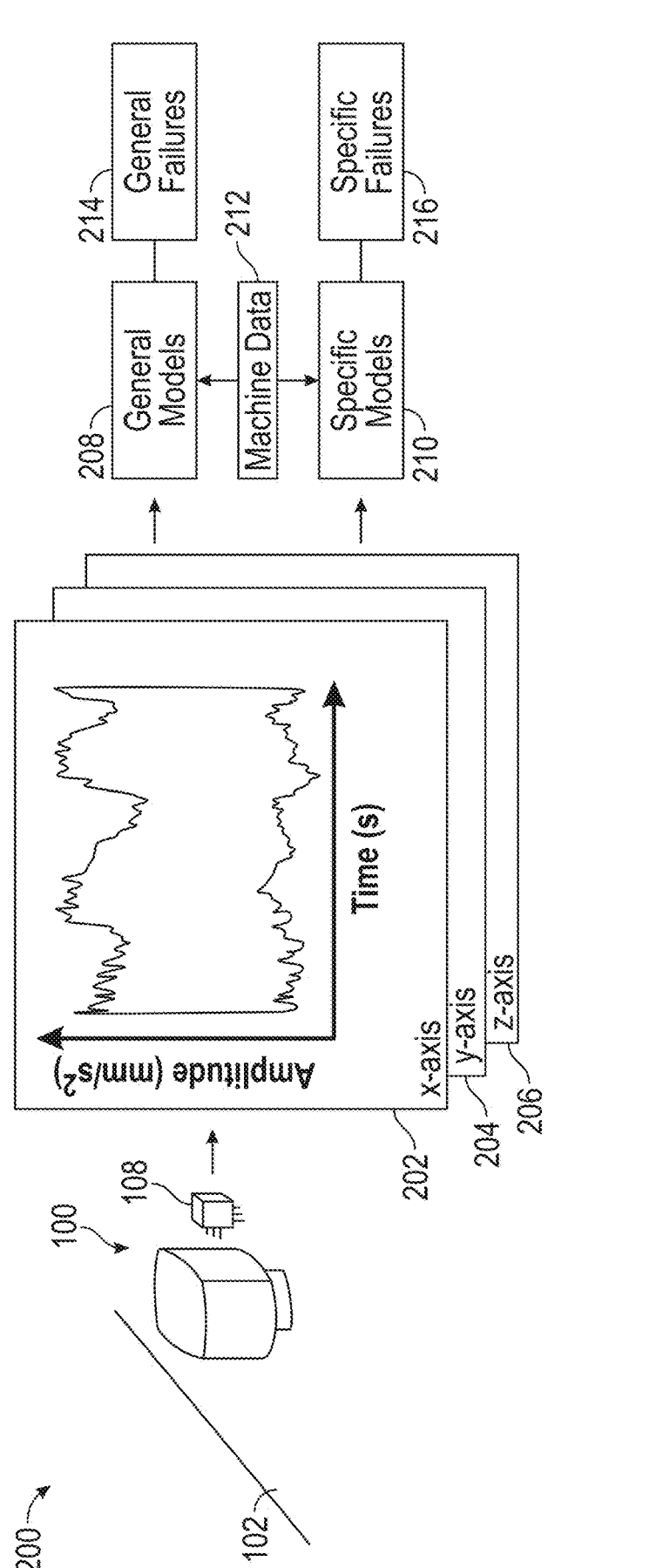
FIG. 2 illustrates a diagram of an example diagnostic workflow, according to an embodiment.

FIG. 2 illustrates a diagram 200 of an example diagnostic workflow, according to an embodiment. The sensor device 100 includes an accelerator 108, which can measure movements of the machine 102 in three directions, along the standard Cartesian coordinate system, the x-axis, the y-axis and the z-axis (the horizontal, the vertical and the depth, respectively). The accelerometer 108 measures and reports x-axis, y-axis and z-axis vibration signals 202, 204, 206. The vibration signals can be received by general models 208, which process the vibration signals and report general failures 214 about the machine 102. General failures 214 may include general diagnostic alerts that do not necessarily flag specific component failures. The vibration signals can also be received and processed by specific models 210, which can report specific failures 216 about the machine 102. Specific failures 216 may include diagnostic alerts flagging specific components of the machine 102. Both general and specific models 208, 210 can rely on machine data 212 to perform diagnostics. Machine data 212 can include machine expected operation specification and parameters, as provided by the manufacturer of the machine 102, an owner or operator of the machine 102, and/or from other sources external to the models 208, 210. The machine data 212 can include RPM data.

FIG. 3 is a process flow chart illustrating an exemplary method 300 that may be performed in some embodiments.

In step 310, a sensor device 100 is attached to a physical machine for monitoring vibration and/or temperature of the machine.

In step 320, the physical machine is monitored with the attached sensor device and the sensor device 100 generates sensor data. In some embodiments, the sensor devices generates, from an integrated accelerometer of a sensor device, three vibration signals. The three vibration signals include an x-axis vibration signal, a y-axis vibration signal and a z-axis vibration signal. The sensor device attached or in contact with the physical machine where the movements of the physical machine induces movements in the sensor device causing the accelerometer to record the three vibration signals, the vibration signals initially received in a time-domain. Additionally, the sensor device 100 generates temperature data of the physical equipment.

In step 330, periodically the sensor device 100 transmits the generated sensor data, via one or more networked routing devices, to one or more servers. In some embodiments, the one or more servers convert the received vibration signal data to a frequency domain, generating x-axis spectrum, y-axis spectrum and z-axis spectrum data.

In step 340, the one or more servers evaluate the generated sensor data and/or the converted spectrum data and detect an occurrence of one more operational anomalies of the physical machine.

In step 350, the system generates a user interface indicating the one or more detected operational anomalies of the physical machine.

In step 360, the system continues to evaluate additional sensor data obtained by the sensor device 100 to determine a change of a detected anomaly. In some embodiments, the one or more servers transmit one or more configuration files and/or other commands that are received by the sensor device. The one or more configuration files and/or other commands change operational functionality of the sensor device 100. For example, the sensor device, based on a received configuration file, may change the sampling frequency of the sensor device (such as obtain more or less samples every so many seconds or milliseconds), and may change the data transmission frequency (such transmitting obtained sample data more or less often). As a result of the change in operation to sensor device, the sensor data received by the system may include a higher or lower resolution of data. Where a higher resolution of data is obtained, the sensor necessarily uses more battery power. Where the sensor device 100 is instructed to obtain higher resolution data or higher sampling rates of data, these period of obtaining the higher resolution data or higher sampling rates of data may be defined, such as 30 seconds, 5 minutes, one hour, etc., and then after this defined period the sensor device automatically switches to obtaining lower resolution data or lower sampling rates of the data. In some embodiments, based on the particular type of detected operation anomaly of the physical machine, the configuration file and/or other commands to change the operational functionality may be generated by the system and transmitted to the sensor device. Thus, changing the resolution of data and/or sampling rate being obtained by the sensor device such that additional detailed analysis of the obtained data may be performed by the system to further assess or evaluate the one or more detected operational anomalies of the physical machine.

In step 370, the system based on the continued evaluation of the additional sensor data, generates an updated user interface indicating a change of the detected one or more operational anomalies.

Figure 4:
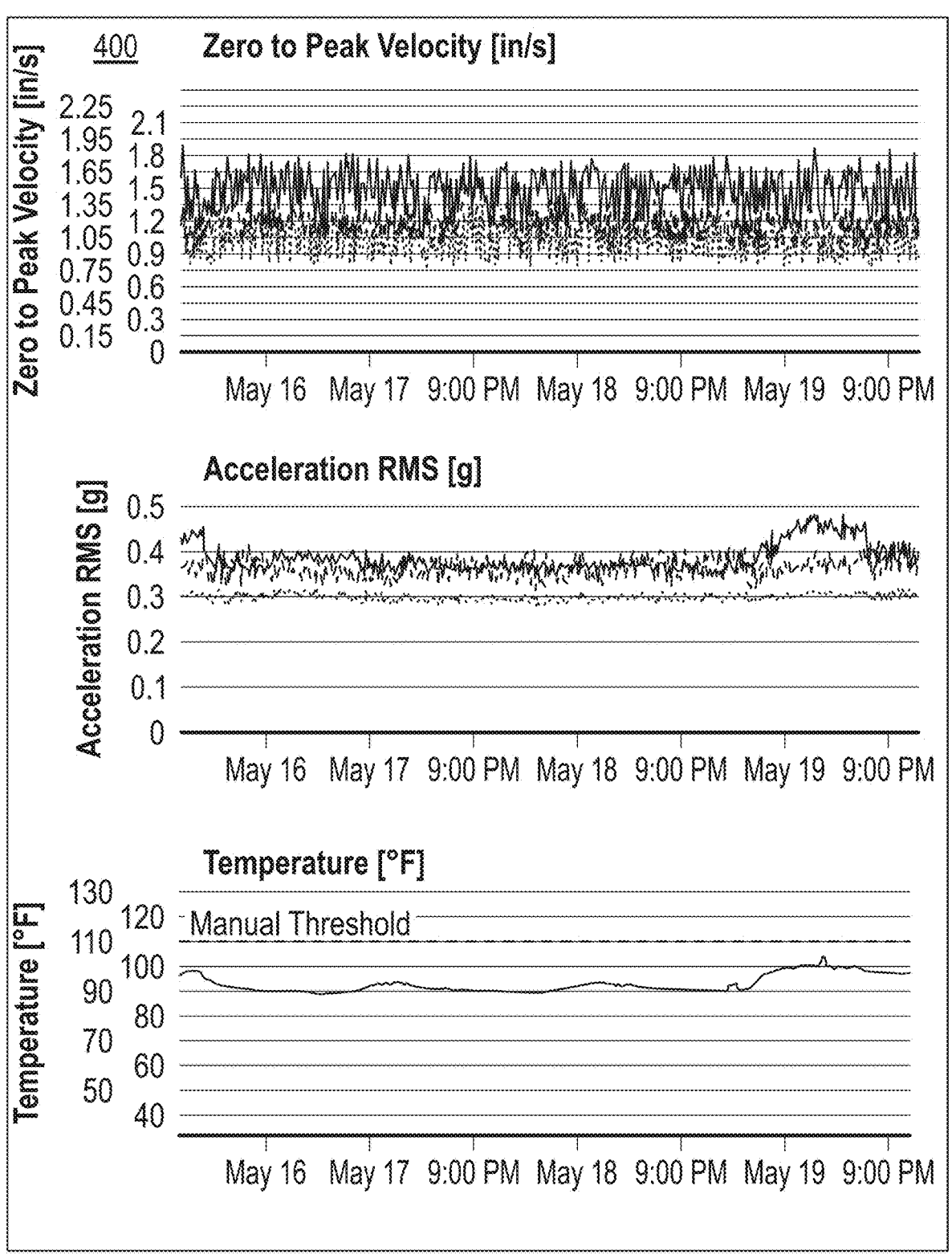
FIG. 4. illustrates an exemplary user interface depicting time series data generated by an attached sensor device to a physical machine.

FIG. 4. illustrates an exemplary user interface 400 depicting time series data generated by an attached sensor device to a physical machine. In some embodiments, the system generates a user interface depicting time-series data obtained from the sensor device. In this example, the user interface 400 depicts data collected over many days by a sensor device attached to a physical equipment. Here the data shows zero to peak velocity data, acceleration RMS data, and temperature data.

Figure 5:
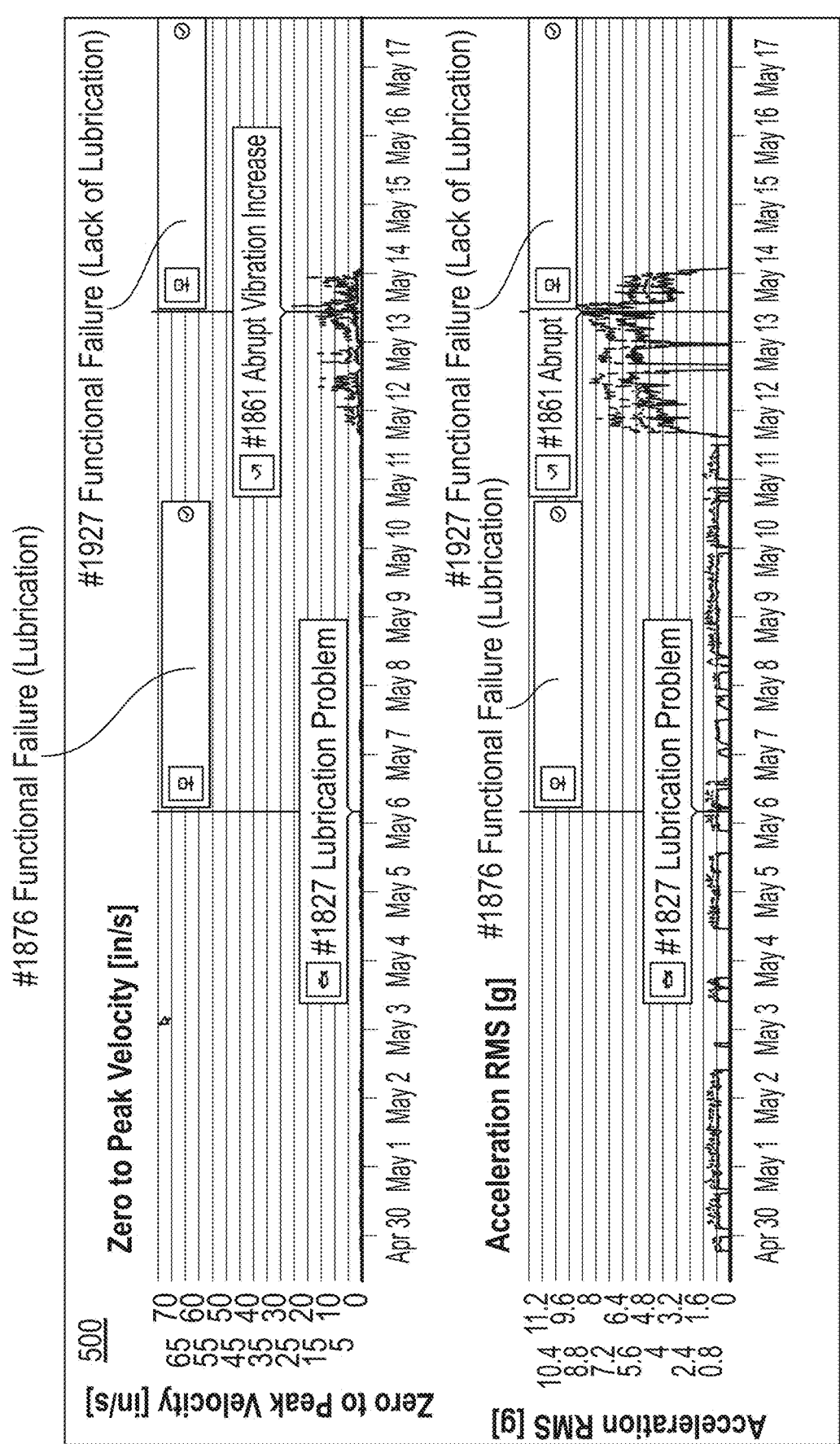
FIG. 5 illustrates an exemplary user interface depicting time series data and the occurrence of an operation anomaly of a physical machine.

FIG. 5 illustrates an exemplary user interface 500 depicting time series data and the occurrence of an operation anomaly of a physical machine. In some embodiments, the system generates a user interface 500 depicting time-series data obtained from the sensor device. In this example, the system evaluates the received sensor data of the physical machine and determines one or more operational anomalies of the physical machine. The system may classify and label the time-series data indicating a specific type of anomaly identified by the system. In some embodiments, the system uses one more trained machine learning models that are trained to identify or predict the occurrence of specific types of anomalies. As depicted in the example user interface, the system has determined a lubrication problem and a functional failure of the monitored physical machine.

Figure 6:
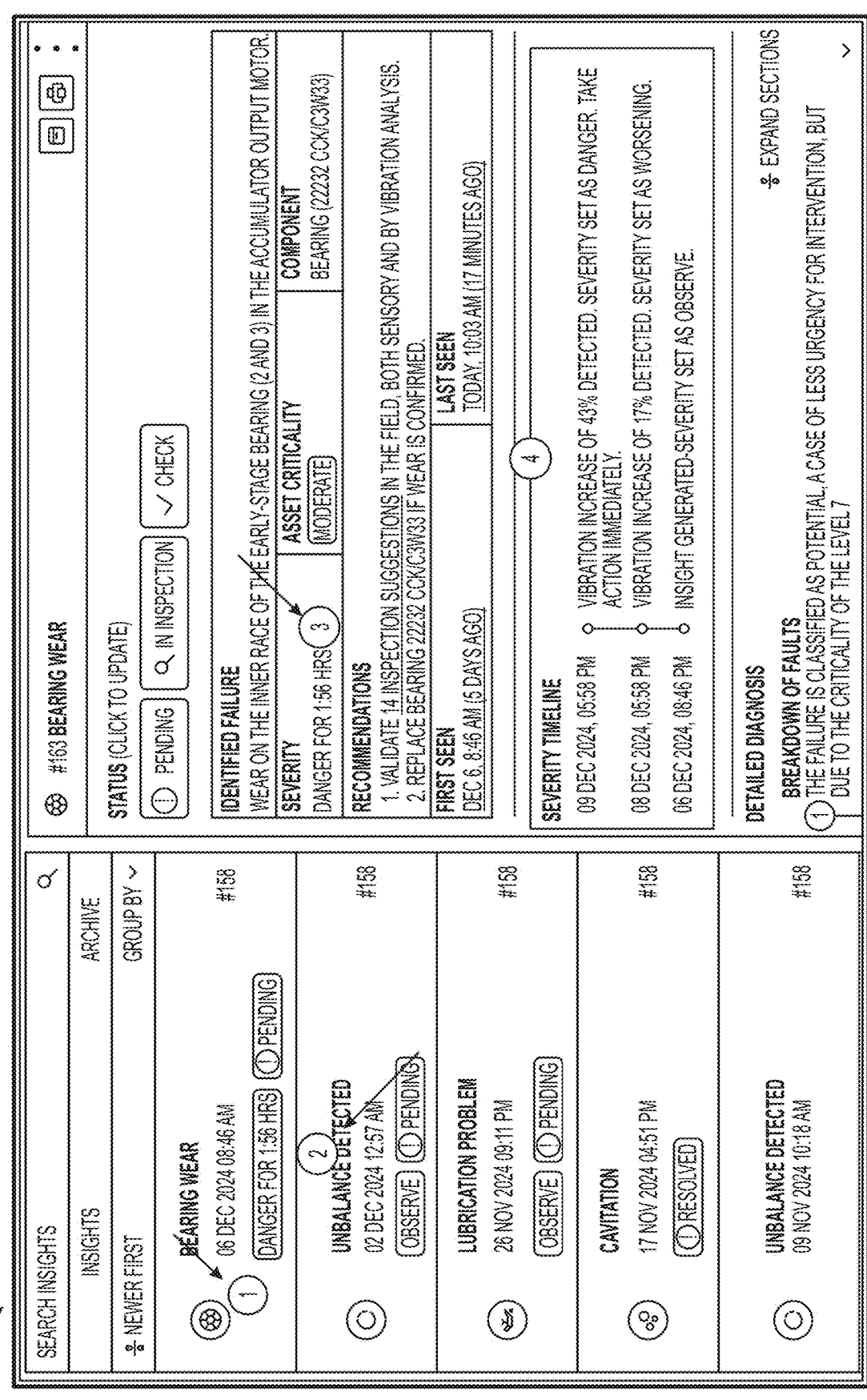
FIG. 6 illustrates an exemplary user interface depicting occurrences of anomalies for a particular physical machine.

FIG. 6 illustrates an exemplary user interface 600 depicting occurrences of anomalies for a particular physical machine. In some embodiments, that system generates a user interface 600 that allows a user to review state and/or detected anomalies of a monitored physical machine. In a portion of the user interface provides a listing of detected anomalies of the monitored physical machine. For example, the listing shows a bearing wear anomaly, an unbalance anomaly, a lubrication anomaly, a cavitation anomaly and another unbalance anomaly.

The user interface 600 may receive an input selecting one of the listed anomalies. In response to the selection, another portion of the user interface depicts additional details about the selected anomalies. This detailed portion of the user interface allows for the input of a status regarding the anomaly. For example, a user may select a pending status, an inspection status or a checking status. This functionality allows a user to track and mange the particular anomaly of the physical machine.

The user interface 600 also provides system generated information about the anomaly based on the continued evaluation of the received sensor data from the attached sensor device 100. For example, the system determines the identified failure and provides a description. The system determines a severity level and a time duration associated with the severity. The system may generation one more recommendation about how to address the identified anomaly. The system may identify the first time the anomaly was detected and the last time the particular anomaly was detected by the system.

Additionally, the system may determine, based on the received sensor data, a severity timeline indication changes in the data. For example, a percentage change of an increase or decrease in the vibration of the physical machine may be determined by the system.

Figure 7:
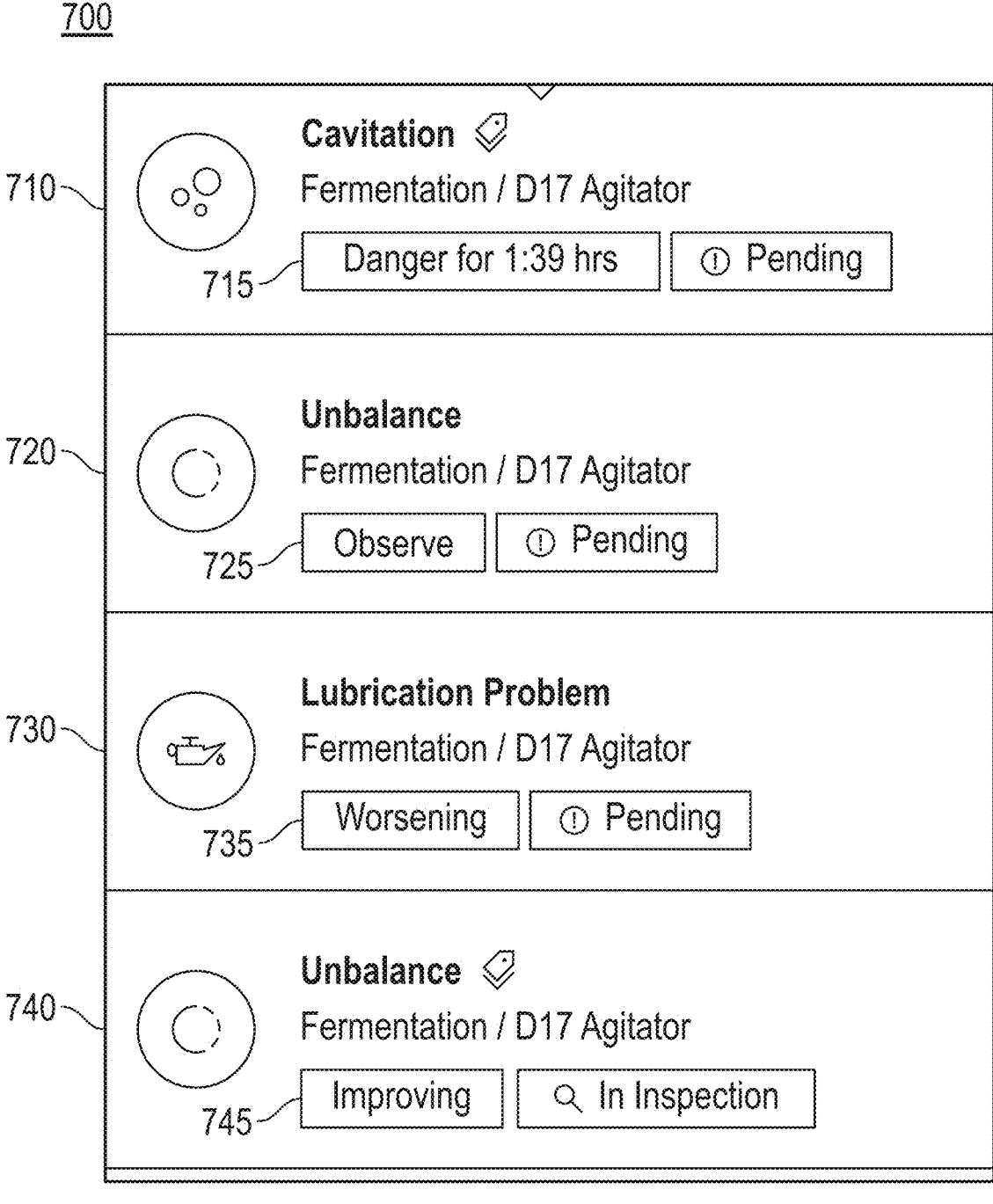
FIG. 7 illustrates exemplary determined equipment condition states for a particular physical machine that is being monitored by an attached sensor.

FIG. 7 illustrates exemplary determined equipment condition states 700 for a particular physical machine that is being monitored by an attached sensor. While periodically evaluating the sensor data obtained from a sensor device attached to a particular machine, the system executes a state machine and/or determines a condition or state of the physical machine. Not only does the system determine or predict an anomaly of the physical machine, but the system automatically assesses a change in the condition of the determined or predicted anomaly.

Examples of determined anomalies are described with respect to a detected cavitation anomaly 710, an unbalance anomaly 720, a lubrication anomaly 730, and the unbalance anomaly. The described detected anomalies are for illustrative purposes, and are not inclusive of all of the anomalies that the system may determine based on the obtained data from the sensor device 100.

The condition state indicates a system determined state for the determined anomaly at a particular point in time. For example, the determined condition state for the cavitation anomaly 710 is the condition state of danger 715. The determined condition state for the unbalance anomaly 720 is an observe condition state 725. The determined condition state for the lubrication anomaly 730 is worsening 735. The determined condition state for the unbalance anomaly 740 is improving.

FIG. 8 is a process flow chart illustrating an exemplary method 800 that may be performed in some embodiments. The exemplary method 800 illustrates a process of obtaining sensor data from a sensor device attached to a physical machine. The system periodically receives the sensor data over a period of time. The system periodically evaluates the received sensor data and also determines the occurrence of an anomaly. While periodically evaluating the received sensor data, the system also determines a condition state. In other words, the system also determines how the condition of the determined anomaly is changing over time.

In step 810, the system assigns an initial condition state to the obtained data associated with a sensor device 100.

In step 820, one or more servers, receive sensor data obtained from the sensor device 100.

In step 830, the received sensor data is evaluated via one or more trained machine learning models.

In step 840, the system determines whether to change the current condition state to a new condition state.

In step 850, the system transitions from the current condition state to the new condition state.

In step 860, the system generates a user interface with an indication of the new condition state. The process of step 820-860 iteratively continues. During this iterative process, the condition state may change multiple times.

FIG. 9 illustrates a table description exemplary equipment states and monitoring time for the condition state. The table describes how different condition states may change from a current state to a new state. A description associated with the type of change is associated the state change. For example, an Observe state may change to a Worsening state, a Danger state or an improving state. A predetermined amount of time may be associated with the change from a current state to a new state where the received sensor data from the sensor device is periodically obtained such a sufficient amount of time has occurred to confirm the change of the state. For example, when starting at the Observe state and to move to the Worsening state, in this example, a set period of minimum time of collecting data from the sensor device 100 is set at a minimum amount of time of 24 hours. Where to change from the Observe state and to move to the Danger state, a set period of a minimum time of collecting data from the sensor device 100 is set at a minimum amount of time of 2 hours.

In some embodiments, the system requires that a confidence level of a predetermined confidence level must be met or exceeded to confirm that the state is actually changing from one state to another. In the example of change from an Observe state to the Worsening state, a confidence level of 65% that the Worsening state is actually occurring must be must. To determine the confidence level of the new state, the system evaluates the received sensor data and determines a confidence value for a change to a new state. After the state has changed to the new state, then an indication of the new state may be displayed via the user interface as depicted in FIG. 6.

Figure 10:
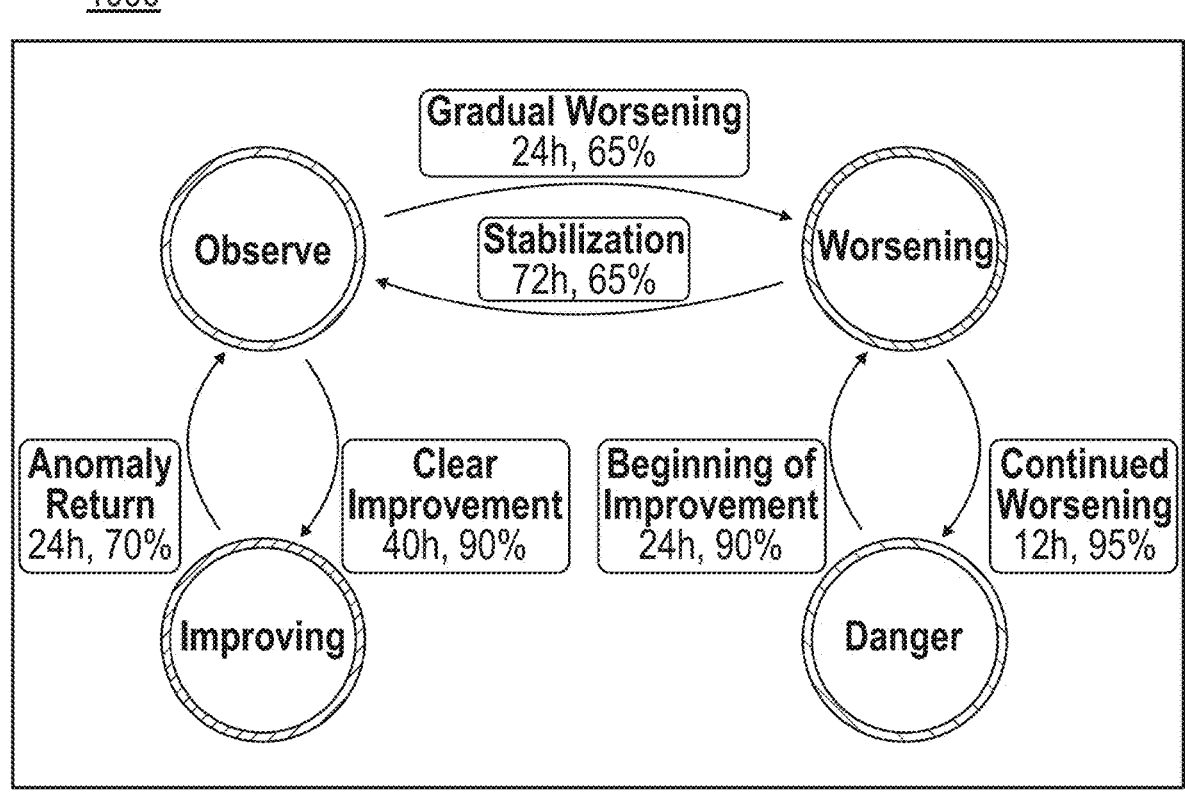
FIG. 10 illustrates an example of the operation of a state determination process to determine the condition state for a physical machine.

FIG. 10 illustrates an example of the operation of a state determination process to determine the condition state for a physical machine. This diagram illustrates an example of states for a determined anomaly changing from one state to another state. To move from one state to another state, exemplary predetermined values for the amount of time and the confidence level is depicted. For example, to move from the Observe state to the Worsening state an amount of time that must pass is set at 24 hours since the Observe state was set. Also, a confidence level of at least 65% of that a Worsening state is actually occurring must be met. To move from the Worsening state to the Observe state an amount of time that must pass is set at 72 hours since the Worsening state was set. Also, a confidence level of at least 65% that an Observe state is actually occurring must be met.

In some embodiments, when a state changes to a new state, then the system generates the configuration file and/or commands that are transmitted to the sensor device 100. The generated configuration file and/or commands instruct the sensor device to change (increase or decrease) the sampling rate or frequency of the sensor device, the rate at which the sensor device transmits obtained sensor data from the sensor device, the resolution or level of detail of the data obtained by the sensor device. Additionally, when completing a change from a Worsening state, Danger state or an Improving state, the system may generate a configuration file and/or commands that are transmitted to the sensor device 100 instructing the sensor device 100 resume normal data acquisition operations.

While the embodiments are described in relation to the available hardware and software components of the maintenance and monitoring infrastructure, the embodiments are not only limited to the environment of the infrastructure. For example, they can be implemented in a computer or a processor environment.

Figure 11:
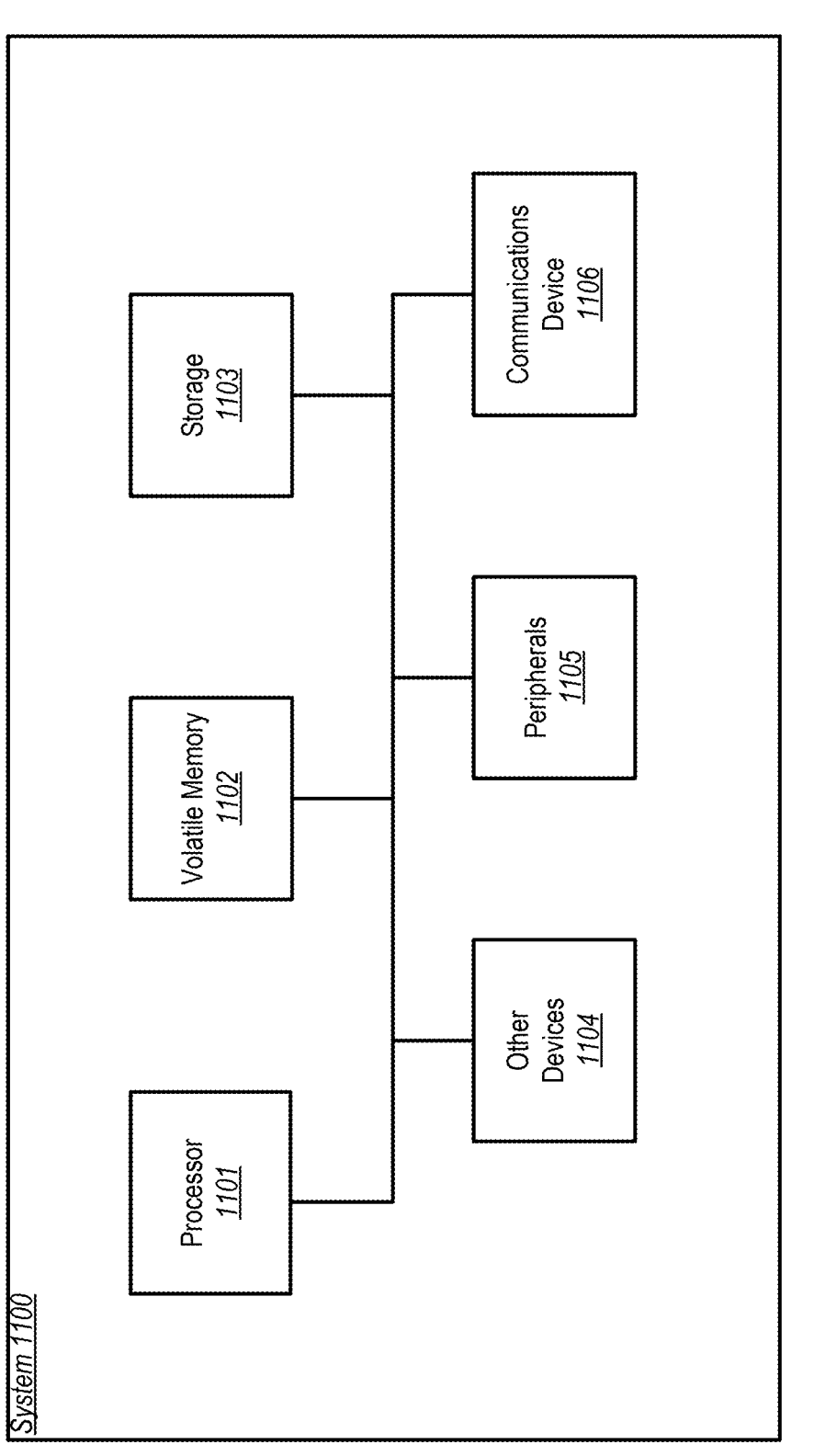
FIG. 11 is a diagram illustrating an exemplary computer that may perform processing in some embodiments.

FIG. 11 is a diagram illustrating an exemplary computer 1100 that may perform processing in some embodiments. Processor 1101 may perform computing functions such as running computer programs. The volatile memory 1102 may provide temporary storage of data for the processor 1101. RAM is one kind of volatile memory. Volatile memory typically requires power to maintain its stored information. Storage 1103 provides computer storage for data, instructions, and/or arbitrary information. Non-volatile memory, which can preserve data even when not powered and including disks and flash memory, is an example of storage. Storage 1103 may be organized as a file system, database, or in other ways. Data, instructions, and information may be loaded from storage 1103 into volatile memory 1102 for processing by the processor 1101.

The computer 1100 may include peripherals 1105. Peripherals 1105 may include input peripherals such as a keyboard, mouse, trackball, video camera, microphone, and other input devices. Peripherals 1105 may also include output devices such as a display. Communications device 1106 may connect the computer 1100 to an external medium. For example, communications device 1106 may take the form of a network adapter that provides communications to a network. A computer 1100 may also include a variety of other devices

1104. The various components of the computer 1100 may be connected by a connection medium such as a bus, crossbar, or network.

FIG. 12 is a process flow chart illustrating an exemplary method 1200 that may be performed in some embodiments. The exemplary method 1200 illustrates a process of obtaining sensor data from a sensor device attached to a physical machine.

In step 1210, a physic machine is monitored with an attached sensor device which generates sensor data. The attached first sensor device is configured to periodically generate data and transmit the generated data to a computing device. In some embodiments, the generated data includes a timestamp for each respective occurrences of the generated data.

Additionally, the attached sensor device comprises a production configuration file that controls the sampling interval and/or sampling rate of data by the attached sensor device.

In step 1220, the system evaluates the generated sensor data to detect the occurrence of one or more operational anomalies of the physical machine. The system periodically receives, via one or more servers, the generated data by the attached sensor device. A copy of the generated data is stored in a data repository that includes generated data that was obtained from multiple different sensors each attached to a respective different physical equipment.

The system uses one or more trained machine learning models to identify, based on input of the periodically received generated data into the one or more trained machine learning model, determines the occurrence of one or more operational anomalies associated with the physical equipment.

In step 1230, the system generates a user interface indicating the determined operational anomaly (such as the user interface depicted in FIG. 6. In some embodiments, the user interface comprises a first portion depicting a description of the determined one or more anomalies, and a second portion depicting detailed information associated with an input selection.

In step 1240, the user interface receives an input, indicating a status change associated with the physical equipment. For example, a user interface may receive an input from a user that indicates that the physical equipment is in inspection, is being maintained, has been taken offline, etc.

In some situations, physical equipment has to be taken off-line and the physical equipment not operated while undergoing maintenance to resolve or fix an identified anomaly. In such cases, the system may temporarily cease receiving data from the attached sensor device for a period of time while maintenance operations are performed on the physical equipment to remedy the identified anomaly.

In step 1250, in response to a change in the status the system automatically generates a configuration file or a command to control a sampling mode of operation of the attached sensor. The configuration file or command is transmitted from a server, and the attached sensor receives the configuration file or command. As explained previously, in some embodiments, the attached sensor is battery operated. Extension of battery life is of utmost importance. To control the operation of the sampling frequency and duration of the attached sensor, the configuration or command may include parameter values that causes the attached sensor from obtaining and/or transmitting any sensor data. In other words, the configuration file or command causes the attached sensor to enter into a low power mode or state. For example, while physical equipment is taken offline and not operated, ideally the sensor would not need to obtain sensor data of inoperative physical equipment.

After the maintenance operation has been performed, the sensor may be placed back into a data acquisition mode for the physical equipment. The user interface may receive an input indicating that maintenance has been performed on the physical equipment and/or that the physical equipment has been fixed. In some embodiments, in response to receiving this input, the system generates new configuration file or command that is transmitted to the attached sensor. This newly generated configuration file or command may cause the attached sensor to obtain more samples or for a longer duration than is normally obtained. For example, since a physical equipment was indicated as being maintained or fixed, more sensor data or higher resolution data could be acquired to determine whether or not that the previously determined anomaly was actually corrected.

In step 1260, the system continues to periodically receive, by the one or more servers, additional data generated by the attached sensor device. With the additionally generated data, the system may evaluate whether the identified anomaly associated with the physical equipment has been resolved.

In step 1270, the system may generate the user interface indicating a healthy or normal state of the physical equipment if the identified anomaly associated with the physical equipment has been resolved.

In some embodiments, the system generates another configuration file or command that is transmitted to the attached sensor. This newly generated configuration file or command may cause the attached sensor to obtain less samples or for a shorter duration than from the previously configuration file sent to the sensor device. In other words, the newly generated configuration file causes the sensor to operate in a production mode to obtain sensor data in the same manner before the determined anomaly occurred. The system then continues to periodically evaluate newly generated sensor data to identify any new anomalies associated with the physical equipment.

Figure 13:
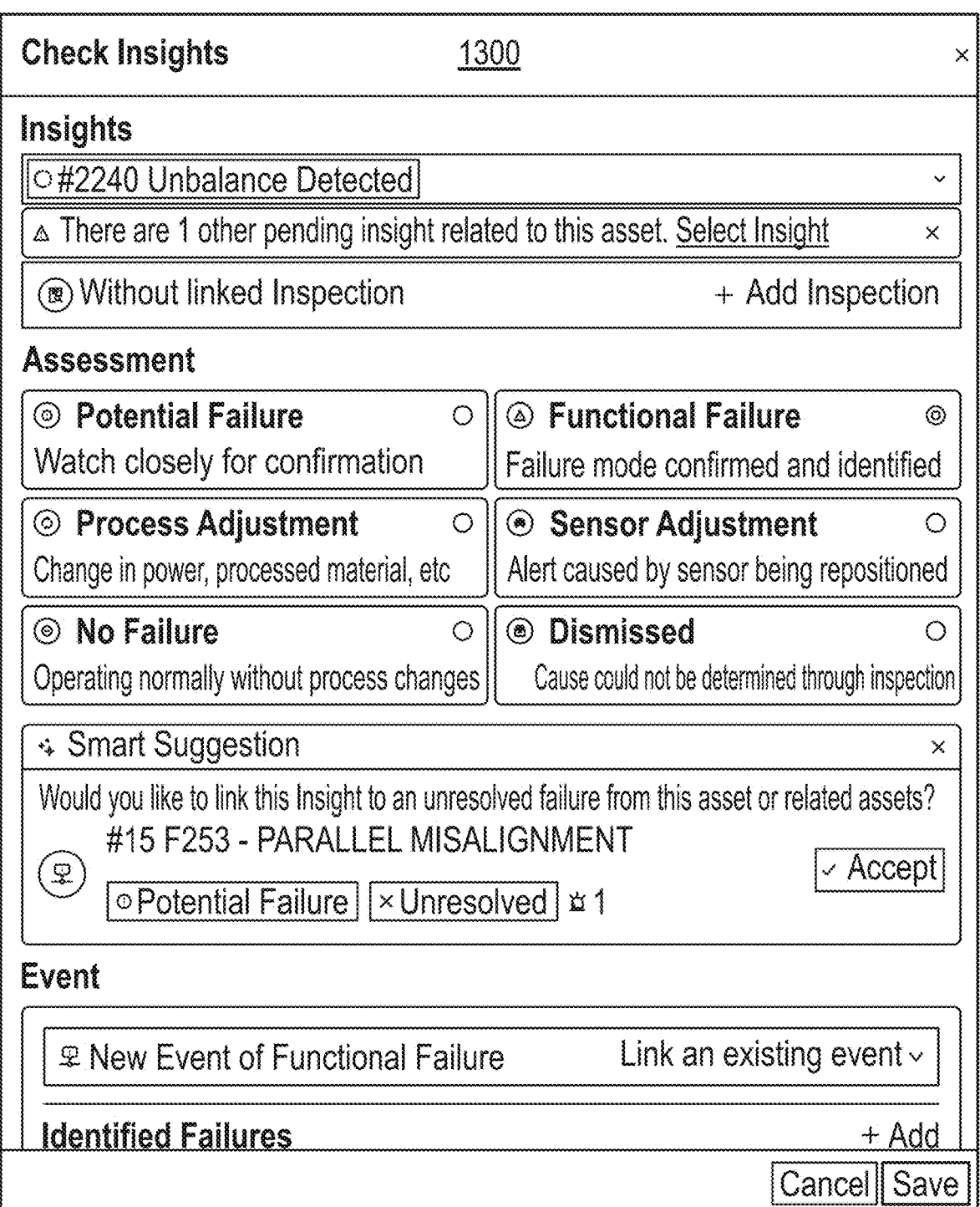
FIG. 13 illustrates an exemplary user interface according to an embodiment.

FIG. 13 illustrates an exemplary user interface 1300 according to an embodiment. The system generates and displays the user interface 1300 in response to selecting an insight for review from the user interface 600 depicted in FIG. 6. The system may receive a response for an assessment indicating a status of the physical equipment after review or inspection of the physical equipment. For example, a user may select an assessment of potential failure, process adjustment, no failure, functional failure, sensor adjustment, dismissed. The system then updates the an assessment status of the physical machine as to the particular anomaly (i.e., the insight rendered for display via user interface 600.

Figure 14:
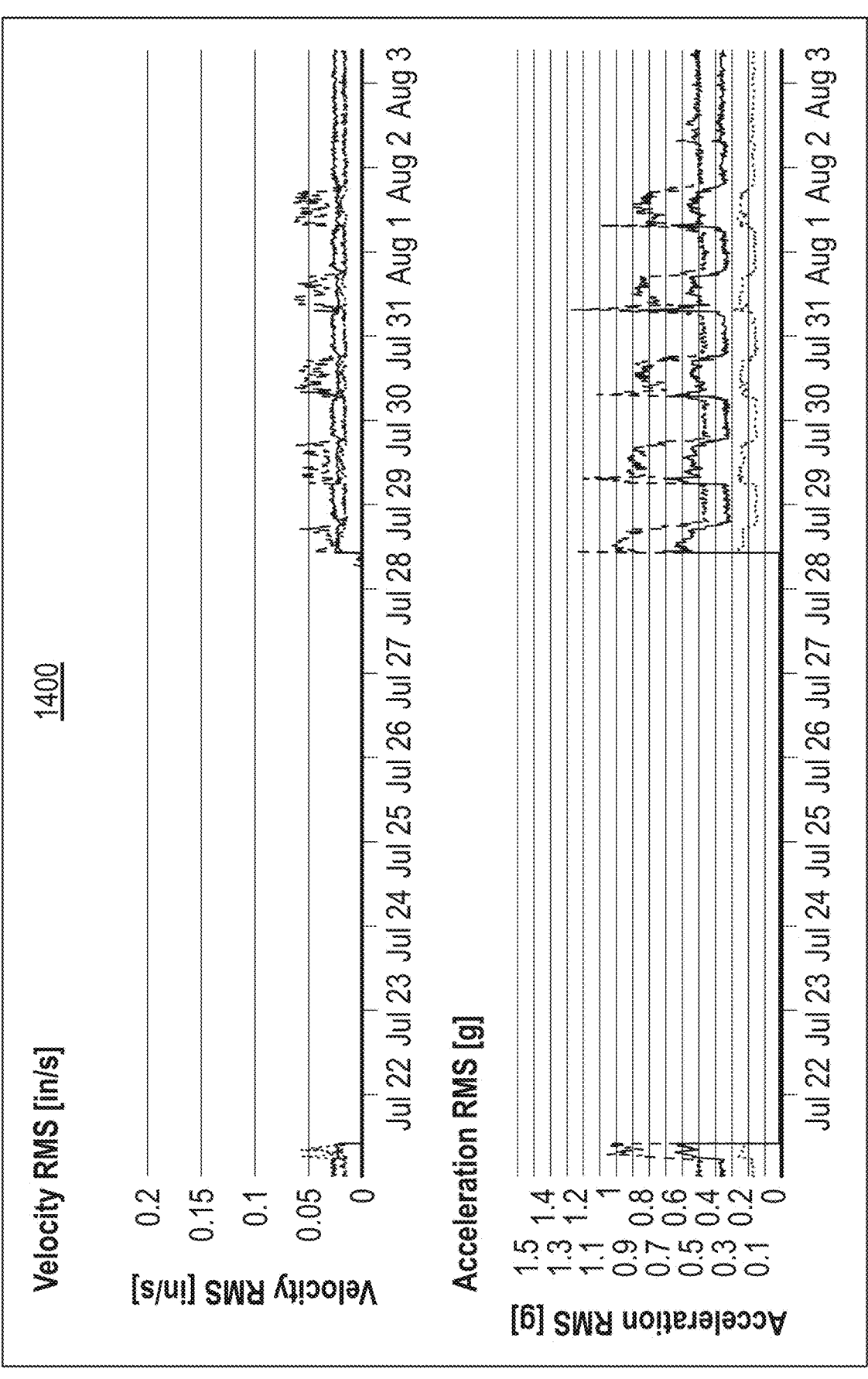
FIG. 14 illustrates an exemplary user interface depicting time series data for a particular physical machine showing a period of machine down time for maintenance.

FIG. 14 illustrates an exemplary user interface 1400 depicting time series data for a particular physical machine showing a period of machine down time for maintenance. As described previously, a physical equipment may be monitored by one or more attached sensors. When a sensor is initially attached to the physical equipment, the sensor will acquire sensor data for a period of time (such as 5-10 days). The acquired sensor data is used to train one or machine learning models such the model is trained with a baseline or a normal mode of operation for the physical equipment. The trained one or more machine learning models then uses subsequent acquired sensor data to determine whether one or more anomalies are occurring with respect to the physical equipment.

Referring to user interface 1400, the physical equipment is indicated as being taken offline for a period of time for maintenance (as shown with the lack of time series data for the period of about July 22 to July 28). In this example, the machine could have been turned off during that time and/or a configuration file/command sent to the attached physical sensor to cease operation of data acquisition by the sensor to preserve battery of the attached sensor.

On July 28, the physical equipment was brought back online, and then the attached sensor begins to acquire sensor data (e.g., the accelerometer data, temperature data, etc.). In some embodiments, a new configuration file is transmitted to the attached sensor (e.g., with sampling parameters) where the sensor then begins acquiring sensor data according to the new configuration file.

In some embodiments, when the maintenance has been completed, the attached sensor will acquire sensor data for a period of time (such as 5-10 days). The system uses the newly acquired sensor data to retrain the one or machine learning models such the model is trained to provide a new baseline or a new normal mode of operation for the physical equipment. The newly trained one or more machine learning models then use the subsequent acquired sensor data to determine whether one or more anomalies are occurring with respect to the physical equipment. The retraining process optimizes the model to more accurately identify subsequent occurring anomalies with the physical. For example, during maintenance, the physical equipment may have a motor, shaft replaced, or other physical adjustments made. The changed physical equipment may cause the equipment to generate different vibrations and/or temperature during its normal operations. To optimize the determination of anomalies, the retraining of the machine learning model(s) with the new sensor generated after the maintenance operations, serves as a new base line for the physical equipment.

In some embodiments, after maintenance is performed on the physical equipment, the attached sensor device then operates in a mode where the sensor sleeps for a period of time, and then wakes for a predetermined period of time where during the waking period, the sensor generates accelerometer data. After the waking period, the sensor goes into a low power state to preserve batter power. In some embodiments, a configuration file transmitted (e.g., originating from a server and received by the attached sensor) includes parameters that indicate the period of sleep time (i.e., the time places the sensor in a low power state), and indicates the period waking time (i.e., the time that places the sensor into a data acquisition mode, or higher power state). The data acquisition mode or higher power state uses more battery power as the onboard accelerometer and thermal sensors need to be powered to obtain sensor data. This process optimizes the battery power usage and extends the life of the battery.

EXAMPLES

It will be appreciated that the present disclosure may include any one and up to all of the following examples.

Example 1. A computer-implemented method comprising: receiving from a first sensor device that is attached to a first physical equipment, data generated by the attached sensor device, wherein the attached first sensor device is configured to periodically generate data and transmit the generated data to a computing device, and wherein the generated data includes a timestamp for each respective occurrences of the generated data, wherein the attached first sensor device comprises a production configuration file that controls the sampling interval and/or sampling rate of data by the attached first sensor device; periodically receiving, via one or more servers, the generated data by the attached first sensor device; storing the generated data in a data repository, wherein the data repository includes generated data obtained from multiple different sensors each attached to a respective different physical equipment; identifying based on the periodically received generated data, the occurrence of an operational anomaly associated with the first physical equipment; generating a user interface comprising a first portion depicting a description of the determined one or more anomalies, and a second portion depicting detailed information associated with an input selection, via the user interface, associated with the determined one or more anomalies; ceasing receiving data from the attached first sensor device of the first physical equipment for a period of time while a maintenance operation is performed on the first physical equipment to remedy the identified anomaly; after the maintenance operation has been performed, periodically receiving, by the one or more servers, additional data generated by the attached first sensor device; evaluating, at least in part, the additional data generated by the attached first sensor device, to determine whether the identified anomaly associated with the physical equipment has been resolved; and generating the user interface indicating a healthy or normal state of the physical equipment if the identified anomaly associated with the physical equipment has been resolved.

Example 2. The computer-implemented method of Example 1, further comprising: receiving, via the user interface, a first input indicating that the equipment is under maintenance; in response to receiving the first input, generating a configuration file for transmission to the attached first sensor device, wherein the configuration file includes one or more parameters to change a sampling interval value and/or a sampling duration period value, and wherein the first input changes a status associated with the physical equipment; transmitting, via a server, the configuration file to the attached first sensor device; receiving the configuration file by the attached first sensor device; and in response to receiving the configuration file by the attached first sensor device, changing a mode of operation of the sampling interval and/or sampling duration period of the attached first sensor device.

Example 3. The computer-implemented method of any one of Examples 1-2, wherein the sampling interval value and/or the sampling duration period is zero.

Example 4. The computer-implemented method of any one of Examples 1-3, further comprising: displaying, the user interface; and receiving, via the user interface, a second input indicating that the physical equipment has been fixed, wherein the second input changes the status associated with the physical equipment.

Example 5. The computer-implemented method of any one of Examples 1-4, further comprising: in response to receiving the second input, generating a subsequent configuration file for transmission to the attached first sensor device, wherein the subsequent configuration file includes one or more parameters to change the sampling interval value and/or the sampling duration period value; transmitting, from the server, the subsequent configuration file to the attached first sensor device; receiving the subsequent configuration file by the attached first sensor device; and in response to receiving the subsequent configuration file by the attached first sensor device, changing a mode of operation of the sampling interval and/or sampling duration period of the attached first sensor device.

Example 6. The computer-implemented method of any one of Examples 1-5, further comprising wherein the change to the sampling interval value and/or sampling duration period value causes the attached first sensor device to increase the sampling interval performed by the attached first sensor device and/or to increase the sampling duration performed by the sensor device.

Example 7. The computer-implemented method of any one of Examples 1-6, further comprising: generating the additional data by the attached first sensor according to the parameters of the subsequent configuration file.

Example 8. The computer-implemented method of any one of Examples 1-7, wherein the first portion displays a description of the determined anomaly and any previously determined anomalies.

Example 9. The computer-implemented method of any one of Examples 1-8, further comprising: evaluating the additional data for a period of time, and automatically changing a status of the physical machine to a health status where no anomalies are determined based on evaluation of the additional generated data; and then displaying the user interface with an indication of a healthy status for the physical machine.

Example 10. The computer-implemented method of any one of Examples 1-9, generating an indication that the physical equipment was not fixed and that the anomaly associated with the physical equipment still exists.

Example 11. A physical equipment monitoring and sensor control system, comprising: multiple sensor devices, each attached to separate physical equipment, wherein each of the multiple sensor devices comprise an accelerometer and a thermal sensor, and wherein each attached sensor device is configured to periodically generate data and transmit the generated data to a computing device, and wherein the generated data includes a timestamp for each respective occurrences of the generated data, and wherein the sensor device is configured to receive remote configuration files and/or commands to change operational functionality of the sensor device; and one or more servers, comprising one or more non-transitory computer-readable media storing computer-executable instructions that, when executed on one or more processors, cause the one or more processors to perform operations: receiving from a first sensor device that is attached to a first physical equipment, data generated by the attached sensor device, wherein the attached first sensor device is configured to periodically generate data and transmit the generated data to a computing device, and wherein the generated data includes a timestamp for each respective occurrences of the generated data, wherein the attached first sensor device comprises a production configuration file that controls the sampling interval and/or sampling rate of data by the attached first sensor device; periodically receiving, via one or more servers, the generated data by the attached first sensor device; storing the generated data in a data repository, wherein the data repository includes generated data obtained from multiple different sensors each attached to a respective different physical equipment; identifying based on the periodically received generated data, the occurrence of an operational anomaly associated with the first physical equipment; generating a user interface comprising a first portion depicting a description of the determined one or more anomalies, and a second portion depicting detailed information associated with an input selection, via the user interface, associated with the determined one or more anomalies; ceasing receiving data from the attached first sensor device of the first physical equipment for a period of time while a maintenance operation is performed on the first physical equipment to remedy the identified anomaly; after the maintenance operation has been performed, periodically receiving, by the one or more servers, additional data generated by the attached first sensor device; evaluating, at least in part, the additional data generated by the attached first sensor device, to determine whether the identified anomaly associated with the physical equipment has been resolved; and generating the user interface indicating a healthy or normal state of the physical equipment if the identified anomaly associated with the physical equipment has been resolved.

Example 12. The physical equipment monitoring and sensor control system of Example 11, further comprising the operations: receiving, via the user interface, a first input indicating that the equipment is under maintenance; in response to receiving the first input, generating a configuration file for transmission to the attached first sensor device, wherein the configuration file includes one or more parameters to change a sampling interval value and/or a sampling duration period value, and wherein the first input changes a status associated with the physical equipment; transmitting, via a server, the configuration file to the attached first sensor device; receiving the configuration file by the attached first sensor device; an in response to receiving the configuration file by the attached first sensor device, changing a mode of operation of the sampling interval and/or sampling duration period of the attached first sensor device.

Example 13. The physical equipment monitoring and sensor control system of any one of Examples 11-12, wherein the sampling interval value and/or the sampling duration period is zero.

Example 14. The physical equipment monitoring and sensor control system of any one of Examples 11-13, further comprising the operations of: displaying, the user interface; and receiving, via the user interface, a second input indicating that the physical equipment has been fixed, wherein the second input changes the status associated with the physical equipment.

Example 15. The physical equipment monitoring and sensor control system of any one of Examples 11-15, further comprising the operations of: in response to receiving the second input, generating a subsequent configuration file for transmission to the attached first sensor device, wherein the subsequent configuration file includes one or more parameters to change the sampling interval value and/or the sampling duration period value; transmitting, from the server, the subsequent configuration file to the attached first sensor device; receiving the subsequent configuration file by the attached first sensor device; and in response to receiving the subsequent configuration file by the attached first sensor device, changing a mode of operation of the sampling interval and/or sampling duration period of the attached first sensor device.

Example 16. The physical equipment monitoring and sensor control system of any one of Examples 11-15, wherein the change to the sampling interval value and/or sampling duration period value causes the attached first sensor device to increase the sampling interval performed by the attached first sensor device and/or to increase the sampling duration performed by the sensor device.

Example 17. The physical equipment monitoring and sensor control system of any one of Examples 11-16, further comprising: generating the additional data by the attached first sensor according to the parameters of the subsequent configuration file.

Example 18. The physical equipment monitoring and sensor control system of any one of Examples 11-17, wherein the first portion displays a description of the determined anomaly and any previously determined anomalies.

Example 19. The physical equipment monitoring and sensor control system of any one of Examples 11-18, further comprising: evaluating the additional data for a period of time, and automatically changing a status of the physical machine to a health status where no anomalies are determined based on evaluation of the additional generated data; and then displaying the user interface with an indication of a healthy status for the physical machine.

Example 20. The physical equipment monitoring and sensor control system of any one of Examples 11-19, generating an indication that the physical equipment was not fixed and that the anomaly associated with the physical equipment still exists.

What is claimed is:

1. A computer-implemented method comprising:

receiving from a first sensor device that is attached to a first physical equipment, data generated by the attached sensor device, wherein the attached first sensor device is configured to periodically generate data and transmit the generated data to a computing device, and wherein the generated data includes a timestamp for each respective occurrences of the generated data, wherein the attached first sensor device comprises a production configuration file that controls the sampling interval and/or sampling rate of data by the attached first sensor device;

periodically receiving, via one or more servers, the generated data by the attached first sensor device;

storing the generated data in a data repository, wherein the data repository includes generated data obtained from multiple different sensors each attached to a respective different physical equipment;

identify based on the periodically received generated data, the occurrence of an operational anomaly associated with the first physical equipment;

generating a user interface comprising a first portion depicting a description of the determined one or more anomalies, and a second portion depicting detailed information associated with an input selection, via the user interface, associated with the determined one or more anomalies;

ceasing receiving data from the attached first sensor device of the first physical equipment for a period of time while a maintenance operation is performed on the first physical equipment to remedy the identified anomaly;

after the maintenance operation has been performed, periodically receiving, by the one or more servers, additional data generated by the attached first sensor device;

evaluating, at least in part, the additional data generated by the attached first sensor device, to determine whether the identified anomaly associated with the physical equipment has been resolved;

generating the user interface indicating a healthy or normal state of the physical equipment if the identified anomaly associated with the physical equipment has been resolved;

receiving, via the user interface, a first input indicating that the equipment is under maintenance;

in response to receiving the first input, generating a configuration file for transmission to the attached first sensor device, wherein the configuration file includes one or more parameters to change a sampling interval value and/or a sampling duration period value, and wherein the first input changes a status associated with the physical equipment;

transmitting, via a server, the configuration file to the attached first sensor device;

receiving the configuration file by the attached first sensor device; and in response to receiving the configuration file by the attached first sensor device, changing a mode of operation of the sampling interval and/or sampling duration period of the attached first sensor device.

2. The computer-implemented method of claim 1, wherein the sampling interval value and/or the sampling duration period is zero.

3. The computer-implemented method of claim 1, further comprising:

displaying, the user interface; and receiving, via the user interface, a second input indicating that the physical equipment has been fixed, wherein the second input changes the status associated with the physical equipment.

4. The computer-implemented method of claim 3, further comprising:

in response to receiving the second input, generating a subsequent configuration file for transmission to the attached first sensor device, wherein the subsequent configuration file includes one or more parameters to change the sampling interval value and/or the sampling duration period value;

transmitting, from the server, the subsequent configuration file to the attached first sensor device;

receiving the configuration file by the attached first sensor device; and in response to receiving the subsequent configuration file by the attached first sensor device, changing a mode of operation of the sampling interval and/or sampling duration period of the attached first sensor device.

5. The computer-implemented method of claim 4, further comprising wherein the change to the sampling interval value and/or sampling duration period value causes the attached first sensor device to increase the sampling interval performed by the attached first sensor device and/or to increase the sampling duration performed by the sensor device.

6. The computer-implemented method of claim 4, further comprising:

generating the additional data by the attached first sensor according to the parameters of the subsequent configuration file.

7. The computer-implemented method of claim 6, wherein the first portion displays a description of the determined anomaly and any previously determined anomalies.

8. The computer-implemented method of claim 6, further comprising the operations of:

evaluating the additional data for a period of time; and automatically changing a status of the physical equipment to a health status where no anomalies are determined based on evaluation of the additional generated data; and displaying the user interface with an indication of a healthy status for the physical equipment.

9. The computer-implemented method of claim 8, further comprising the operations of:

generating an indication, via the user interface, that the physical equipment was not fixed and that the anomaly associated with the physical equipment still exists.

10. A physical equipment monitoring and sensor control system, comprising:

multiple sensor devices, each attached to separate physical equipment, wherein each of the multiple sensor devices comprise an accelerometer and a thermal sensor, and wherein each attached sensor device is configured to periodically generate data and transmit the generated data to a computing device, and wherein the generated data includes a timestamp for each respective occurrences of the generated data, and wherein the sensor device is configured to receive remote configuration files and/or commands to change operational functionality of the sensor device; and one or more servers, comprising one or more non-transitory computer-readable media storing computer-executable instructions that, when executed on one or more processors, cause the one or more processors to perform operations:

receiving from a first sensor device that is attached to a first physical equipment, data generated by the attached sensor device, wherein the attached first sensor device is configured to periodically generate data and transmit the generated data to a computing device, and wherein the generated data includes a timestamp for each respective occurrences of the generated data, wherein the attached first sensor device comprises a production configuration file that controls the sampling interval and/or sampling rate of data by the attached first sensor device;

periodically receiving, via one or more servers, the generated data by the attached first sensor device;

storing the generated data in a data repository, wherein the data repository includes generated data obtained from multiple different sensors each attached to a respective different physical equipment;

identify based on the periodically received generated data, the occurrence of an operational anomaly associated with the first physical equipment;

generating a user interface comprising a first portion depicting a description of the determined one or more anomalies, and a second portion depicting detailed information associated with an input selection, via the user interface, associated with the determined one or more anomalies;

ceasing receiving data from the attached first sensor device of the first physical equipment for a period of time while a maintenance operation is performed on the first physical equipment to remedy the identified anomaly;

after the maintenance operation has been performed, periodically receiving, by the one or more servers, additional data generated by the attached first sensor device;

evaluating, at least in part, the additional data generated by the attached first sensor device, to determine whether the identified anomaly associated with the physical equipment has been resolved;

generating the user interface indicating a healthy or normal state of the physical equipment if the identified anomaly associated with the physical equipment has been resolved;

receiving, via the user interface, a first input indicating that the equipment is under maintenance;

in response to receiving the first input, generating a configuration file for transmission to the attached first sensor device, wherein the configuration file includes one or more parameters to change a sampling interval value and/or a sampling duration period value, and wherein the first input changes a status associated with the physical equipment;

transmitting, via a server, the configuration file to the attached first sensor device;

receiving the configuration file by the attached first sensor device; and in response to receiving the configuration file by the attached first sensor device, changing a mode of operation of the sampling interval and/or sampling duration period of the attached first sensor device.

11. The physical equipment monitoring and sensor control system of claim 10, wherein the sampling interval value and/or the sampling duration period is zero.

12. The physical equipment monitoring and sensor control system of claim 10, further comprising the operations of:

displaying, the user interface; and receiving, via the user interface, a second input indicating that the physical equipment has been fixed, wherein the second input changes the status associated with the physical equipment.

13. The physical equipment monitoring and sensor control system of claim 12, further comprising the operations of:

in response to receiving the second input, generating a subsequent configuration file for transmission to the attached first sensor device, wherein the subsequent configuration file includes one or more parameters to change the sampling interval value and/or the sampling duration period value;

transmitting, from the server, the subsequent configuration file to the attached first sensor device;

receiving the configuration file by the attached first sensor device; and in response to receiving the subsequent configuration file by the attached first sensor device, changing a mode of operation of the sampling interval and/or sampling duration period of the attached first sensor device.

14. The physical equipment monitoring and sensor control system of claim 13, wherein the change to the sampling interval value and/or sampling duration period value causes the attached first sensor device to increase the sampling interval performed by the attached first sensor device and/or to increase the sampling duration performed by the sensor device.

15. The physical equipment monitoring and sensor control system of claim 13, further comprising:

generating the additional data by the attached first sensor according to the parameters of the subsequent configuration file.

16. The physical equipment monitoring and sensor control system of claim 15, wherein the first portion displays a description of the determined anomaly and any previously determined anomalies.

17. The physical equipment monitoring and sensor control system of any claim 15, further comprising the operations of:

evaluating the additional data for a period of time; and automatically changing a status of the physical equipment to a health status where no anomalies are determined based on evaluation of the additional generated data; and displaying the user interface with an indication of a healthy status for the physical equipment.

18. The physical equipment monitoring and sensor control system of claim 17, further comprising the operations of:

generating an indication, via the user interface, that the physical equipment was not fixed and that the anomaly associated with the physical equipment still exists.

* * * * *